United States Patent [19]

Lash

[11] Patent Number: 4,848,020
[45] Date of Patent: Jul. 18, 1989

[54] TACKLE RETRIEVER APPARATUS

[76] Inventor: Gerald D. Lash, Sanford, Fla.

[21] Appl. No.: 75,436

[22] Filed: Jul. 20, 1987

[51] Int. Cl.⁴ ............................................... A01K 97/00
[52] U.S. Cl. ...................................... 43/17.2; 43/42.72
[58] Field of Search ..................... 43/17.2, 42.72, 42.19

[56] References Cited

U.S. PATENT DOCUMENTS

| | | | |
|---|---|---|---|
| 2,189,979 | 2/1940 | Fender | 43/42.72 |
| 2,606,390 | 8/1952 | Farmer | 43/42.72 |
| 2,665,903 | 1/1954 | Green | 43/42.72 |
| 2,739,407 | 3/1956 | Godsey | 43/17.2 |
| 2,754,611 | 7/1956 | Riner | 43/42.72 |
| 3,010,240 | 11/1961 | Surcout | 43/17.2 |
| 3,011,284 | 12/1961 | Sawyer | 43/42.72 |
| 3,217,443 | 11/1965 | Goodman | 43/42.72 |
| 3,714,730 | 2/1973 | Lloyd | 43/17.2 |
| 4,748,763 | 6/1988 | Giraudo | 43/17.2 |

FOREIGN PATENT DOCUMENTS

| | | | |
|---|---|---|---|
| 148178 | 12/1936 | Fed. Rep. of Germany | 43/42.72 |
| 619312 | 4/1961 | Italy | 43/42.72 |

Primary Examiner—Kurt Rowan
Attorney, Agent, or Firm—William M. Hobby, III

[57] ABSTRACT

A tackle retriever apparatus for use with fish hooks and lures includes a coiled spring having an end portion on each end thereof extending from the coiled portion and having an eye formed on each end portion thereof. A connector for attaching a lure to one end of the coiled spring is attached to one of the eyes formed on the coiled spring. An elongated spring stop rod has a loop formed on either and thereof and extends axially through the middle portion fo the coiled spring and has each loop extending around the one end portion of the coiled spring so that the elongated spring stop rod limits the expansion of the coiled spring. The tackle retriever may include a swivel, as well as a spinner attached thereto.

1 Claim, 1 Drawing Sheet

TACKLE RETRIEVER APPARATUS

BACKGROUND OF THE INVENTION

The present invention relates to tackle retrievers and especially to those tackle retrievers which use the reactionary force from a coiled spring to release a fishing hook or lure from a snag.

It is fairly common for fishermen to get their hooks and lures entangled or snagged in debris, sunken logs, rocks, and the like, located beneath the surface of the water. This is true whether the fisherman is fishing in rivers, lakes, or even on the seashore. A variety of hook and lure designs have been provided in the past for preventing the lure hook from becoming snagged but which at the same time will not prevent a fish from grabbing the hook. However, even snagless hooks become snagged and in a typical case, the fisherman will make rapid jerks of the fishing line in an attempt to break the hook loose from the snag. A quick pull on the line, followed by a quick release to first pull the hook in one direction followed by a reactionary force will sometimes break the hook loose. The present invention is directed towards a means for bringing an axial thrust to bear upon the hook so as to urge it in the opposite direction of the pulled line. A coiled spring is utilized which expands when the line is pulled rapidly in one direction and when released, a reactionary force from the coiled spring will jar the hook free of its snagged position.

A number of prior art U.S. patents have suggested using the reactionary force from a coiled spring to try to knock a hook, lure, or sinker loose from a snag. These prior art patents include a U.S. patent to Circue, U.S. Pat. No. 3,010,240 for a fishing line retriever having a coiled spring leader for releasing a fishing lure and in the U.S. patent. to Webber, Sr., U.S. Pat. No. 4,514,926 a coiled spring leader is used for releasing a snagged fish hook. In the U.S. patent to Sarakas, U.S. Pat. No. 2,616,203, an attachment for fish hooks acts both to hold the fish hook and includes a coiled spring for producing the force for releasing the hook from a snag. The Hanson patent, U.S. Pat. No. 3,447,828 shows a tackle retriever which also includes a coiled spring. The Smizaski, et al., patent, U.S. Pat. No. 3,465,465 has a reaction sinker including a coiled spring for releasing the sinker from wedged positions. The Devins patent, U.S. Pat. No. 2,594,852 shows another coiled spring tackle releasing connection as does the Klawitter patent, U.S. Pat. No. 3,037,035. The U.S. patent to Lloyd, U.S. Pat. No. 3,714,730 shows a fishing lead having coiled springs attached thereto. These prior art patents illustrate the principal of utilizing a coiled spring to produce a reactionary force for releasing a fishing lure but are generally more complex than the present invention which utilizes a conventional coiled spring having an eye formed on each end for holding a swivel or hook attaching connector and has a simple spring stop rod extending through the spring and wrapped around each end of the spring to prevent the spring from expanding past a predetermined expansion and to also prevent the spring from interfering with the fisherman's activities and landing a fish.

SUMMARY OF THE INVENTION

The present invention relates to a tackle retriever for use with fish hooks and includes a coiled spring having an end portion on each end thereof and having an eye formed on each end portion for attaching a hook, swivel, or connector. An elongated rod member has a loop formed on either end thereof so that the rod passes axially through the middle portion of the coiled spring and has each end looped extending around one end portion of the coiled spring so that the elongated rod limits the expansion of the coiled spring. The coiled spring may have a spinner attached thereto and a safety pin type connector connected to one eye of the end portion of the coiled spring and a fish hook attached to the other eye of the coiled spring if desired. The spinner may be attached between the elongated spring stop rod end loop and one coiled spring end portion eye or may be attached in-between the elongated spring stop rod end loop and the coileded portion of the coiled spring.

BRIEF DESCRIPTION OF THE DRAWINGS

Other objects, features, and advantages of the present invention will be apparent from the written description and the drawings in which.

DESCRIPTION OF THE PREFERRED EMBODIMENT

Figure 1:
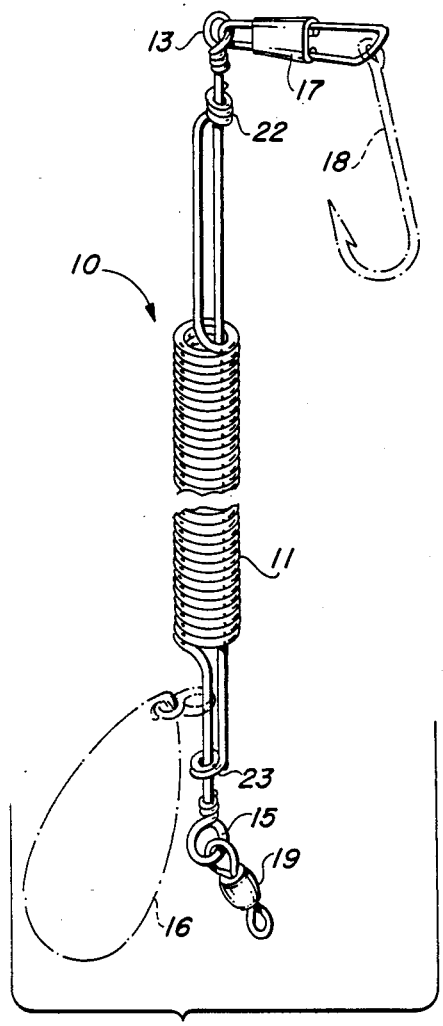
FIG. 1 is a perspective view of a tackle retriever in accordance with the present invention.
Figure 2:
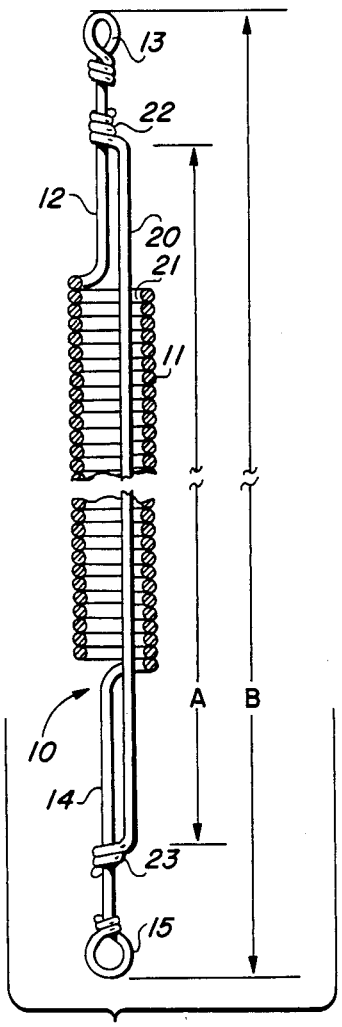
FIG. 2 is a sectional view of a tackle retriever in accordance with FIG. 1 in its normal position.
Figure 3:
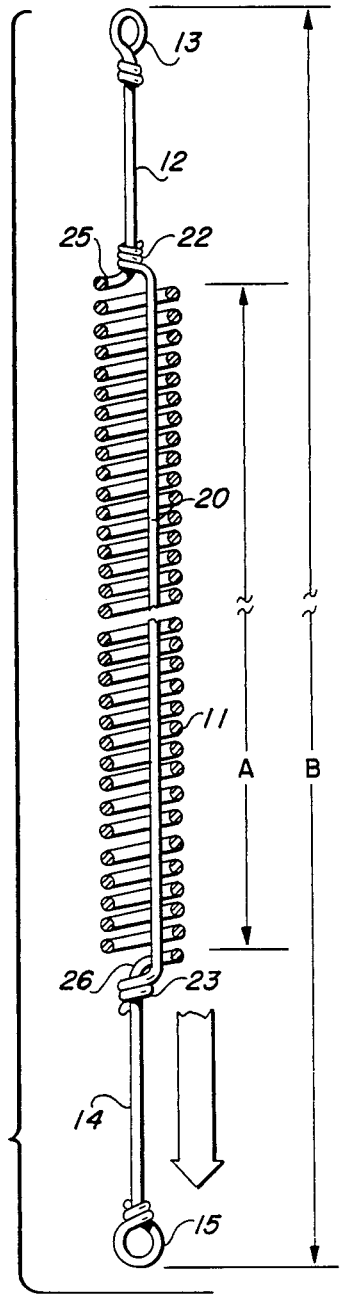
FIG. 3 is a sectional view in accordance with FIG. 2 having the coiled spring in an expanded position.

Referring to the drawings and especially to FIGS. 1 through 3, a fishing tackle retriever 10 is illustrated formed with a coiled spring 11 having one end portion 12 having an eye 13 formed in the end thereof. A second end portion 14 of the coiled portion 11 has an eye 15 formed on the end thereof. A spinner 16 may be attached to the end portion 14 while a safety pin type connector 17 may be attached to the eye 13 and may have a hook 18 attached thereto. The connector 17 could also have a fishing lure or any other fishing accessory desired attached thereto. A spring limiting rod 20 extends axially through the center 21 of the coiled spring 11 and has a loop 22 formed on one end thereof and extending around the end portion 12 of the coiled spring 11 and has a loop 23 formed on the other end thereof and extending around the coiled spring end portion 14. This rod 20 slides freely on the end portions 12 and 14. The eye 15 has a swivel 19 attached thereto for attaching a fishing line or the like.

As seen in FIG. 2, the coiled spring is normally in a retracted position but a sudden yank on the coiled spring will expand it as shown in FIG. 3 until the coileded portion of the spring at 25 and at 26 intersects the loops 22 and 23 to thereby prevent further expansion of the coiled spring 11 any greater than the length of the rod 20. The difference can be seen by the letters A and B in FIG. 2 and then a different amount of expansion as shown in FIG. 3. Thus, if a hook 18 becomes snagged, a sudden jerk on the fishing line will pull directly upon the coiled spring 11 expanding from the spring shown in FIG. 2 from that shown in FIG. 3. A sudden release of the fishing line will then allow the coiled spring 11 to rapidly jerk back into position, pushing the fish hook in the opposite direction and freeing it from a snag.

Figure 4:
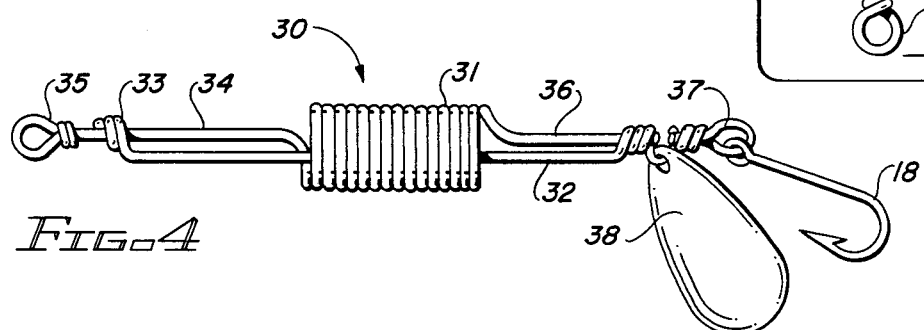
FIG. 4 is an elevational view of a tackle retriever having a smaller coiled spring.

FIG. 4 shows another embodiment 30 having a coiled spring 31 in a smaller size than shown in FIGS. 1 through 3 and a smaller expansion limiting rod 32 having loops 33 in each end. The coiled spring 31 has end portions 34 having an eye 35 and an end portion 36 having an eye 37. A spinner 38 is attached between a loop 33 and the eye 37 to the coiled spring end portion 36.

Figure 5:
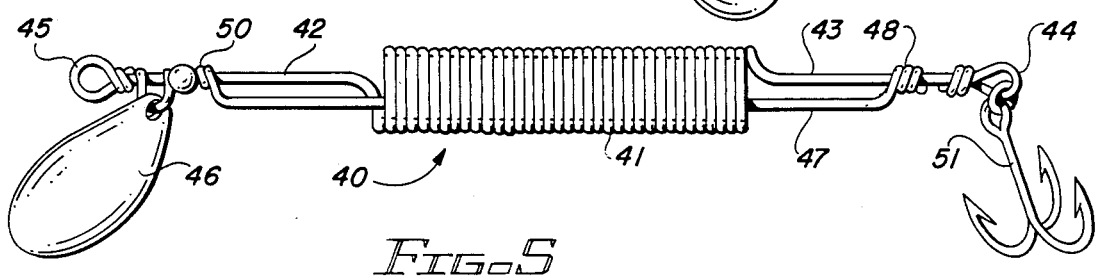
FIG. 5 is an elevational view of a tackle retriever with yet a different size coiled spring and having a spinner attached thereto.

In FIG. 5, a tackle retriever 40 has a coiled spring 41 having an end portion 42 and a second end extension 43 having an eye 44 on the end thereof. The extension 42 has an eye 45 on the end thereof and a spinner 46 attached to the end 42. The spring limiting rod 47 has end loops 48 and 50 and a triple hook 51 is attached to the eye 44.

It should be clear at this point that a tackle retriever of the type utilizing a coiled spring has been provided but it should also be clear that the coiled spring acts as a portion of the leader and acts as a shock absorber, as well as releasing fish hooks and lures from snags. It should be clear that a fishing leader of this type is simpler to manufacture where the spring serves more than one purpose. Accordingly, the present invention is not to be considered limited to the forms shown which are to be considered illustrative whether than restrictive.

I claim:

1. A tackle retriever for use with fishhooks comprising:
   a coiled spring having an end portion on each end thereof extending from the coiled portion thereof and having an eye formed on each end portion thereof;
   a safety pin connection for attaching a lure to one end of said coiled spring, said safety pin connection being attached to the eye formed on one end of said coiled spring end portion;
   a swivel attached to the eye formed on said coiled spring other end;
   a spinner movably attached to said coiled spring other end portion, said spinner being attached between said elongated spring stop rod end loop and one coiled spring end portion eye; and
   an elongated spring stop rod having a loop formed on either end thereof, said spring stop rod passing axially through the middle portion of said coiled spring and having each said loop extending around one end portion of said coiled spring; whereby said elongated spring stop rod limits the expansion of said coiled spring.

* * * * *